July 8, 1952    J. A. SIMPSON, JR    2,602,904
RADIATION DEVICE AND METHOD OF CONSTRUCTION
Filed April 26, 1945    2 SHEETS—SHEET 1

Witnesses:
Herbert E. Metcalf
William J. Ruano

Inventor:
John A. Simpson Jr
By Robert A. Lavender
Attorney

July 8, 1952     J. A. SIMPSON, JR     2,602,904
RADIATION DEVICE AND METHOD OF CONSTRUCTION
Filed April 26, 1945     2 SHEETS—SHEET 2
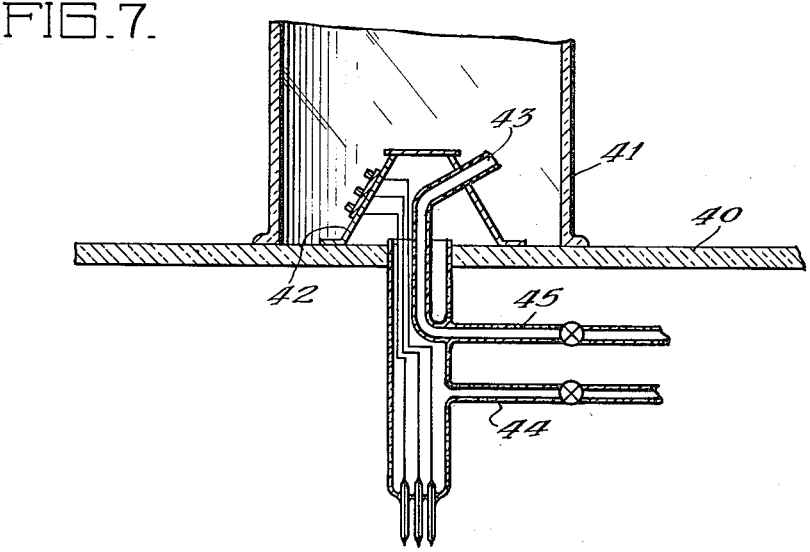
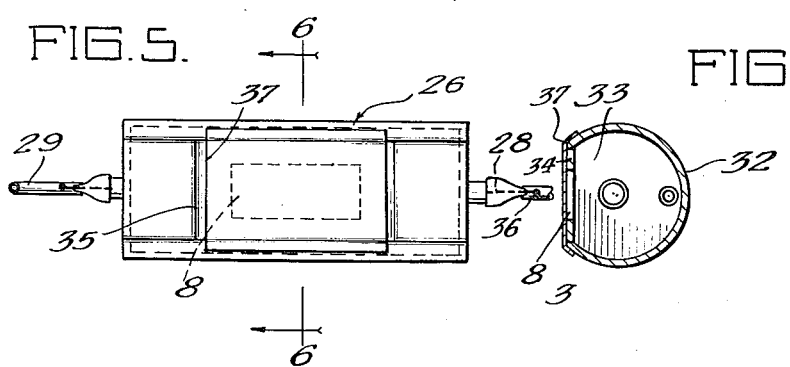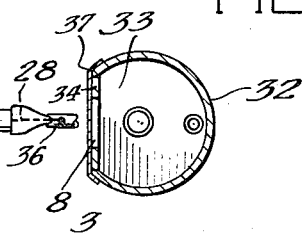
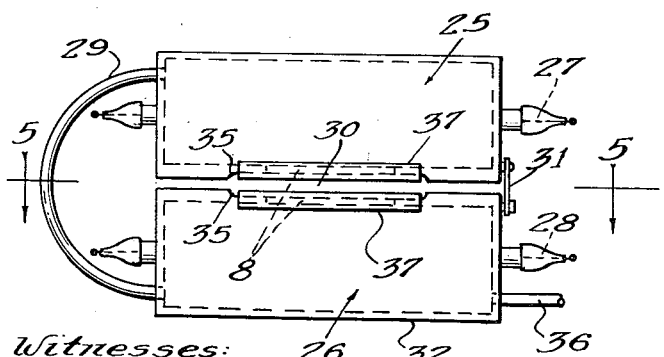
Witnesses:
Inventor:
John A. Simpson Jr.
By: Attorney.

Patented July 8, 1952

2,602,904

UNITED STATES PATENT OFFICE 2,602,904

RADIATION DEVICE AND METHOD OF CONSTRUCTION

John A. Simpson, Jr., Chicago, Ill., assignor to the United States of America as represented by the United States Atomic Energy Commission Application April 26, 1945, Serial No. 590,424

11 Claims. (Cl. 313—93)

My invention relates to a radiation counter, and more specifically to a counter of the Geiger-Müller type that is adapted to measure the total activity of a radioactive sample, including soft radiations, such as soft beta rays.

Artificially induced radioactive isotopes have become important tools in biological research. The activity of such isotopes are commonly determined with an electrometer, electroscope, or glass or metal walled Geiger-Müller tube. Unfortunately, the radioactive isotopes of some of the important biological elements, such as, $Na^{22}$, $S^{35}$, $Ca^{45}$, and $Fe^{55}$, have radiations which are too soft to penetrate the metal or glass walls of ordinary counters. To measure such weak radiations, screen walled counters have been used in the past. However, since each sample must be mounted inside the tube and the tube evacuated and filled with an appropriate gas mixture before the radioactivity may be determined, this method is very time consuming. This is a serious disadvantage in work that requires the measurement of a large number of samples.

In the past, radiation counters of the Geiger-Müller type have been built for measuring total activity of a radioactive sample or thin foil. However, such counters have the common disadvantage of being responsive to a limited area or solid angle of emanation of the radioactive sample. Some of these counters, known as $2\pi$ counters, are capable of measuring radiations from one surface only of a radioactive thin foil, or of measuring radiations from only one side or surface of a spherical radioactive sample. An outstanding disadvantage of this type of counter is that it is not subjected to the "total" activity of the radioactive sample, that is, it is not responsive to radiations emanating radially outwardly from all directions of the sample. This is a disadvantage particularly in low intensity measurements.

An object of my invention is to provide a radiation counter that is devoid of the above mentioned disadvantages and that is capable of giving an indication of "total" activity of a radioactive sample that emits not only hard but soft radiations, such as low energy beta rays.

A more specific object of my invention is to provide a radiation counter of the Geiger-Müller type that is responsive to radiations emanating through substantially a "complete" solid angle, namely an angle of substantially $4\pi$ steradians.

Another object of my invention is to provide a radiation counter of the Geiger-Müller type that has a suitable thin window in its wall that is transparent to very soft radiations, such as low energy beta rays.

Another object of my invention is to provide a novel method and apparatus for filling a Geiger-Müller counter of a new type having a thin window without the danger of collapsing the window.

Other objects and advantages will become apparent from the following description taken with the drawings, wherein:

Fig. 4 is a longitudinal side view of a modified form of a $4\pi$ type Geiger-Müller counter;

Fig. 5 is a sectional view taken along line 5—5 of Fig. 4;

Fig. 6 is a sectional view taken along line 6—6 of Fig. 5;

Fig. 7 is a fragmentary view of a differential vacuum system for filling the counters shown in Figs. 1 to 6 inclusive.

Figure 1:
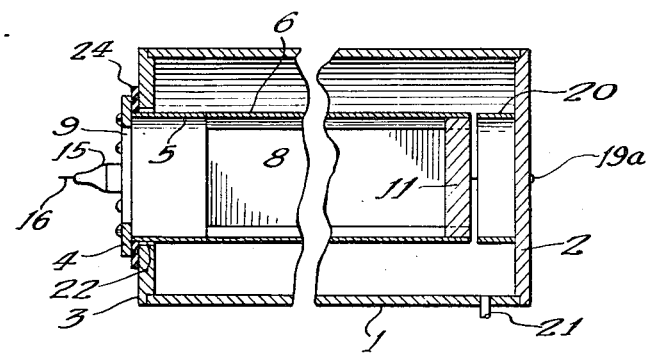
Fig. 1 is a longitudinal sectional view of a $4\pi$ type Geiger-Müller counter following the teachings of the present invention.
Figure 2:
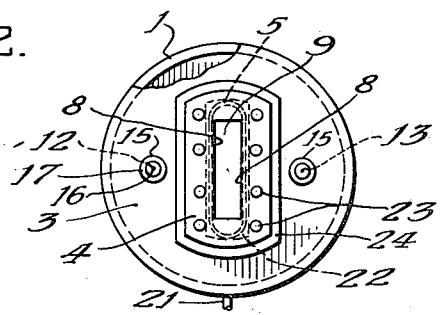
Fig. 2 is a top view of the counter shown in Fig. 1.
Figure 3:
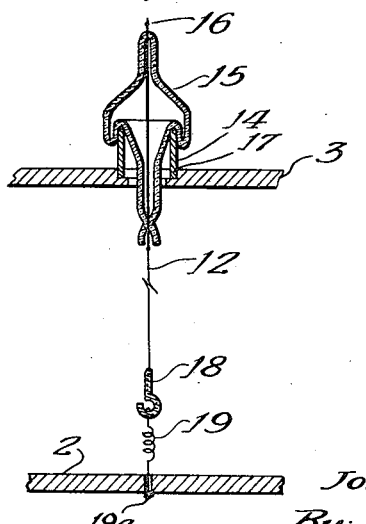
Fig. 3 is an anode wire support assembly for supporting each of the anodes in the counter shown in Figs. 1 and 2.

Figs. 1 to 3 inclusive show a novel Geiger-Müller type counter which is useful for measuring the total activity of a radioactive sample that emanates both hard and soft radiations, such as gamma rays and beta rays, respectively, and that is responsive to radiations emanating substantially within a "complete" solid angle, namely substantially an angle of $4\pi$ steradians. A solid angle is defined as the angular spread in the vertex of a cone, or the like, measured by the area intercepted on a unit sphere, about the vertex as a center, by the cone surface. In a "complete" solid angle the bounding surface, having a point as a vertex, is a closed surface, as the surface of a sphere having its center as a vertex. A "complete" solid angle measures $4\pi$ steradians.

Referring more particularly to Figs. 1 and 2, numeral 1 denotes a cylindrical cathode made of brass, for example, enclosed at the bottom (or to the right as illustrated) by a bottom plate 2 and at the top by plate 3, both of which plates are soldered to the ends of the cylindrical cathode 1. The plate 3 is apertured and supports in sealed relation therewith a smaller apertured metal plate 4. Extending from and soldered to plate 4 is a shoulder 5 formed from strip brass, for example. At the diametrically opposite curved portions of shoulder 5 are attached substantially semi-circular or half portions of metal tubing 6 that extend into the counter volume and are held in place at the end of shoulder 5 by a fitted soldered joint, thus forming a frame. Over this frame a large metal or plastic foil is wrapped so as to form two large windows 8 between the edges of tubing 6. This assembly including the double-windowed frame or "bag" is inserted through hole 22 of top plate sealing 3, and the apertured plate 4 is fastened by screws 23 to the top of plate 3 through an intervening sealing gasket 24 of "neoprene" or other similar material to make the system vacuumtight. A solid plate 11 is soldered at the extremity of the tubing portions 6, thus forming a complete chamber or receptacle which is open to the atmosphere only through the hole 9 of plate 4, through which hole radioactive materials may be introduced, such as, for example, thin metallic radioactive foils. The counter chamber proper is substantially annular in shape and defined by the inner wall made up of portions 6, windows 8 and solid plate 11, and outer walls defined by the cathode 1 and plates 2 and 3. A pair of anode wires 12 and 13 are provided, one opposite each of the windows 8, the wires being supported in a manner shown in Fig. 3.

Referring more particularly to Fig. 3, numeral 14 denotes a metal collar of Kovar or other metal having a substantially similar temperature coefficient of expansion as the glass to which it is sealed, said collar 14 being attached to a glass seal 15 through which a lead-in wire 16 extends in fused relationship with the glass seal. Collar 14 fits into a seat 17 in plate 3 and is hermetically welded or soldered to the plate. Each of the anode wires 12 and 13 may be in the form of a 3-mil tungsten wire, for example, although other metals and dimensions may be used as well. The lower end of anode wires 12 and 13 are sealed to the shank of glass hooks 18. Springs 19 of Phosphor bronze for example, are prepared with an extra length of wire extending from the lower end of each of the anode wires 12 and 13, so that the whole of each of the anode-wire support-assemblies may be lowered into seats 17 and the glass 15 sealed to the collars 14. The opposite end of each of the wires 19 is brought under tension by pulling the wire extension of spring 19 through a small hole in plate 2. This hole is closed with solder 19a around the wire to maintain the spring and wire at the required tension.

If it is not desirable in a particular case to allow solid plate 11 to touch bottom plate 2, a guard ring 20 that is shaped like shoulder 5 may be soldered to the bottom plate 2 of the counter. This guard ring 20 is essential to avoid any field-free region in the counter where ions might drift and ultimately cause spurious counts.

The method of assembly of the counter parts is as follows: the top plate 3 and bottom plate 2, either with or without guard ring 20, are soldered to cylinder 1. A filling tube 21 of copper, for example, is soldered to the side wall of cylindrical cathode 1 for admitting gases. The interior of the unit is thoroughly cleaned. It is especially important that all dust be removed. The metal frame composed of elements 4, 5, 6, and 11 is silver-soldered together. Elements 5, 6, and 11 are then tinned on their edges, and one end of a suitable metal foil is sweat-soldered by rosin flux, for example, to a tubing portion 6. It is then wrapped around the unit to bring the opposite foil edge back to the same tubing portion 6. All edges are then soldered vacuum tight along the joints formed by shoulder 5, tubing 6 and solid plate 11. If a plastic window is used, then cement is used to form vacuum-tight windows. The exterior surface is cleaned, and if organic material is permissible in the interior volume of the counter, a suitable organic material, such as Zapon clear lacquer, is allowed to form a thin film on the interior of the bag. The anode wires 12 and 13 are then cleaned and installed. Gasket 24 is cut and fitted when the window frame is inserted in the counter. If the air is humid, seals 15 may be dipped in ceresin wax to avoid charges thereon.

One of the most satisfactory thin metal foils useful to form windows 8 is that known as "nickel-silver shimstock" and is commonly used in engine bearing repairs. It can be obtained in thicknesses of 1 mil or more. Thin metal windows of from 1 to 3 mil thickness will allow the soft component of radiations, such as low energy beta rays, to travel therethrough, so that such soft components of radiations from point-source artificially radioactive isotopes, for example, can be detected and measured. "Nickel-silver shimstock" is also remarkably free from pin holes, solders easily, and does not stretch appreciably when placed under tension. The thickness of the commercial product is constant over large areas. Other materials which are useful as window materials are aluminum and copper and various sheet plastics, and where strength is not an outstanding requirement, mica and cellophane, for example.

It will be seen that if a sheet or body of radioactive material is inserted through hole 9 of perforated plate 4, one side of the sheet or body is exposed to a volume containing anode wire 12 while the other surface of the sheet or body is exposed to a volume containing anode wire 13. Each side of the radioactive sheet or body emanates radiations through a solid angle of substantially $2\pi$, thereby giving a total angle of substantially $4\pi$ steradians for the entire counter. Because of the large counter volume, the unit has a fairly high background counting rate. If the sources to be measured have low radioactivity, the anode wires may be operated in parallel.

Figs. 4, 5, and 6 show a modification of the counter shown in Figs. 1 to 3 which is also responsive through a substantially "complete" solid angle, that is, an angle of substantially $4\pi$ steradians. Referring more particularly to Figs. 4 and 5, numerals 25 and 26 denote two complete counters of the Geiger-Müller type arranged with their anode wires 27 and 28, respectively, in parallel relationship, as are the substantially cylindrical cathodes that define a substantial portion of the walls of counters 25 and 26. Both extremities of anode wires 27 and 28 may be supported in the manner shown in the upper part of Fig. 3. That is, the lower extremity of the spring 19 is extended through a glass seal similar to 15 (not shown) and then soldered exteriorly thereof. The two counters 25 and 26 are interconnected for gas intercommunication by tube 29 of copper, for example, which equalizes the internal gas pressure of the counters. Counters 25 and 26 may be moved apart so as to facilitate introduction therebetween of the activated sample by virtue of the flexible pivot connection provided by tube 29. The activated sample to be measured is placed in a recess 30 between the windows 8 of counters 25 and 26. Counters 25 and 26 are locked together in close parallel relationship by a clamp and lock unit 31 after the radioactive foil is placed in position.

The details as well as the method of assembly of each of the counters 25 and 26 may be better understood by reference to Fig. 5. The counter is constructed as follows: Seamless tubing 32 of brass, for example, is placed in a wooden clamping jig (not shown) which prevents the tubing 32 from springing outwardly when a longitudinal section thereof is machined out by a milling machine, this section being later closed by an apertured longitudinal plate 34. End plates 33, closing opposite ends of the tubing 32, as well as the longitudinal plate 34 with a window or aperture 8, are silver soldered in place while the tubing 32 is still held in the jig. A recess 35 of about 3 to 5 mils, for example, is cut out of the top surface of plate 34 by a milling machine. Next the connecting tube 29 and filling tube 36 are silver soldered in place. An area of the plate 34 completely surrounding window 8 as well as a portion of the wall 32 area is tinned, preferably with soft high tin content solder, and then the counter is cleaned to remove all traces of solder flux. The anode wire units are prepared in the same manner as described in connection with Fig. 3 with the exception that similar lead-ins are provided at both ends of the anode wires. Each of the anode wires, with one seal attached, is lowered through one end plate hole so the freed lead-in wire comes through the other end plate hole on the far side. Another duplicate seal is then slipped over this lead-in and soldered in place. Tension is provided by pulling on the anode wire lead-in at the duplicate seal, then the final sealing process is carried out.

The nickel-silver foil 37, preferably of 1 to 3 mils (0.001 to 0.003 inch) in thickness is tinned in the regions that come in contact with the counter body, that is, plate 34 and the side portions of tubing 32 over which the window foil over-laps in order to provide a firm bond therewith. The foil is sweat-soldered in place and pulled taut to avoid appreciable curvature when a large pressure differential exists between the inner and outer surface of the window. The area enclosed by window 8 and covered by the foil 37 indicates the portion through which soft radiations such as low energy beta rays enter the counter volume.

Plastic windows can be attached with cement. The assembled unit can be tested for large leaks by immersing the counter under air pressure in a soap solution. The outer surface of the counter is then coated with Zapon lacquer, for example, by a dipping process to make it vacuumtight. The dips add about 0.5 mil to the window thickness, but provide a convenient method for sealing minute leaks.

The counters can be operated at any suitable pressure up to about 1 atmosphere once they are vacuumtight, provided the windows are not much larger than about 3 by 5 centimeters. All edges of the counter in contact with the windows should be rounded to avoid fracture. The counters described will have low background counting rates and plateaus which are about 100 volts long. Counters approximately 18 centimeters long have a background of about 180 counts per minute when unshielded in a contaminated room. With an alcohol vapor pressure filling of 2 centimeters of Hg plus an argon filling of 76 centimeters of Hg, they will have starting potentials of about 2000 volts. When filled with argon plus 10 per cent alcohol to a total pressure of 10 centimeters Hg, the starting potentials are about 940–1000 volts, and the plateaus are about 200 volts long. Particularly stable counters utilizing the described construction are obtained when filled to one atmosphere pressure with 75 per cent methane and 25 per cent argon by volume.

Once the counters are made vacuumtight they are stable. One of the greatest difficulties encountered is that of obtaining a clean interior which is of prime importance for avoiding spurious counts.

If it is desirable to use a counter over a single radioactive surface, such as over a liquid surface, a single section, such as either counter 25 or 26, may be used with a window contour cut to coincide with the shape of the liquid container or perimeter of the radioactive surface.

Inasmuch as thin-walled metallic or plastic windows, particularly when they are of substantial size or extremely thin, are easily subjected to collapsing when a sizeable difference of pressure exits between the inner and outer surface thereof, special precautions should be taken in the filling of counters.

Fig. 7 shows a suitable differential vacuum system for evacuating and testing counters for leaks under high vacuum as well as for filling counters having very thin or large windows. A ground glass plate 40 is provided and has mounted thereon a large bell jar 41 (only a portion of which is shown) which encloses the counter (not shown). The counter is placed on a table 42 while its filling tube 21 (Fig. 1) or tube 36 (Fig. 4) is connected to tube 43 which is in turn connected to the pump conduit 45. The bell jar 41 may be evacuated through a conduit 44. By evacuating the bell jar and counter slowly and simultaneously through conduits 44 and 45 there will be no resultant differential pressure between the inner and outer surfaces of the window foils. A manometer (not shown) is connected between these conduits to record pressure differences. Following evacuation a few centimeters Hg pressure of air is admitted through conduit 44. This initial pressure difference will remain constant if no leaks are present.

The counter gas is then admitted through conduit 45 while admitting air through conduit 44 so as to avoid large pressure differences. When the desired counter gas pressure has been reached, such as of the order of 1 atmosphere, the conduit 44 is opened to atmospheric pressure. Such a procedure in filling counters not only prevents collapse of the foil windows but conserves expensive gases.

It will be seen therefore that I have provided an efficient radiation counter that is responsive to radiations emanating from a sample through a solid angle of substantially $4\pi$ steradians and which counter has suitably thin metallic or plastic windows so as to admit low energy beta rays, thereby enabling substantial detection of the total activity of a radioactive sample or foil. I have also provided an efficient and simple apparatus for testing for vacuumtightness and for filling such counters.

It should be noted that modifications of the above described apparatus will be readily suggested to those skilled in the art after having had the benefit of the teachings of my invention, which modifications would be within the purview or scope of the present invention. For this reason, the invention should not be limited except insofar as set forth in the following claims.

What is claimed is:

1. A radiation measuring device comprising, in combination, a pair of spaced wire-like electrodes, fluid retaining electrically conducting wall means defining a single gas enclosure, a gaseous ionizing medium disposed within said gas enclosure, and a pair of mutually confronting radiation permeable windows disposed between said electrodes, said windows forming a portion of the wall means, so that the radioactivity of an object may be measured by placing the object exterior to the gas enclosure and between the radiation permeable windows.

2. A radiation measuring device comprising the elements of claim 1 wherein the fluid retaining electrically conducting wall means comprises a cylinder closed at one end and provided with an aperture at the other end, and a substantially bag-shaped receptacle sealed to the periphery of the aperture and extending into the cylinder from said aperture, the confronting radiation permeable windows being disposed within opposite sides of the bag-shaped receptacle.

3. A radiation measuring device comprising the elements of claim 1 wherein the fluid retaining electrically conducting wall means comprises a pair of approximately semi-cylindrical members, each member having closed ends and a flat side and being provided with an aperture in one end, a U-shaped hollow tube with ends sealed about the peripheries of the apertures, said tube restraining the two members in position with the flat surfaces of said members confronting each other, each member containing one of the wire-like electrodes and having one of the radiation permeable windows disposed in the flat side thereof.

4. A radiation counter of the Geiger-Müller type comprising, in combination, a cylindrical gas-filled cathode chamber, a pair of wire-shaped anodes therein eccentrically disposed, longitudinally of and in parallel relationship with the axis of said chamber, a substantially bag-shaped receptacle extending from an end wall of said cathode chamber for receiving a radioactive sample whose activity is to be measured, said receptacle being open to the surrounding atmosphere and being coextensive with and located between said anode wires, said receptacle being formed of a framework including a bottom portion and a pair of semicircular portions of metal tubing extending along the sides and around which is wrapped a thin foil of material admitting soft radiations so as to form a pair of confronting windows, one opposite each of said anodes.

5. A radiation counter for detecting radiations emanating through substantially a "complete" solid angle from an irradiated sample comprising, in combination, a pair of substantially cylindrical Geiger-Müller type tubes, interlocking means mounting the axes of the tubes in parallel relationship, each tube containing a wire-shaped anode axially thereof, and each tube having a window of foil-like material to admit soft beta rays longitudinally thereof, the interlocking means disposing the windows in confronting relationship and contiguous to each other, so that both hard and soft radiations emanating from substantially all directions of an irradiated sample therebetween may be detected.

6. A radiation counter for detecting radiations emanating through substantially a complete solid angle from an irradiated sample comprising, in combination, a pair of substantially cylindrical Geiger-Müller type tubes filled with gas, interlocking means connected to the two tubes including means for providing gas-intercommunication between said tubes to effect gas pressure equalization, said tubes being mounted with their axes in parallel relationship, each tube containing a wire-shaped anode axially thereof and each tube having a window of foil-like material for admitting soft beta rays longitudinally thereof, the interconnecting means disposing said windows in confronting relationship and contiguous to each other so that both hard and soft radiations emanating from substantially all directions of an irradiated sample therebetween may be detected.

7. A radiation counter for detecting radiations emanating through substantially a complete solid angle from an irradiated sample comprising, in combination, a pair of substantially cylindrical Geiger-Müller type tubes, interconnecting means mounting the axes of the tubes in parallel relationship, said means including a tube of soft metal forming a passage between the two tubes, each tube containing a wire-shaped anode axially thereof and each tube having a window of foil-like material for admitting soft beta rays longitudinally thereof, said interconnecting means disposing the windows in confronting relationship and contiguous to each other so that both hard and soft radiations emanating from substantially all directions of an irradiated sample may be detected.

8. A radiation counter comprising, in combination, a pair of Geiger-Müller type tubes each having a substantially cylindrical cathode forming a wall portion thereof, an axially disposed wire-shaped anode therein, a longitudinal portion of each tube being cut away and covered with thin foil thereby providing a window that is transparent to soft radiations, and interconnecting means mounting the windows in confronting relationship and contiguous to each other, whereby a radioactive sample in sheet form may be placed between the windows of the chambers.

9. A radiation counter comprising, in combination, a pair of Geiger-Müller type tubes each having a substantially cylindrical cathode forming a wall portion thereof and an axially disposed wire-shaped anode therein, a longitudinal portion of each tube being cut away and covered with a thin foil thereby providing a window that admits soft radiations, and interconnecting means attached to the two tubes mounting the windows in confronting relationship and contiguous to each other, said means including a conduit of soft metal interconnecting corresponding ends of said tubes so as to form a pivot for spreading said tubes apart as well as to provide gas-pressure equalization between said tubes.

10. A radiation counter comprising, in combination, a pair of Geiger-Müller type tubes each having a substantially cylindrical cathode forming a wall portion thereof and an axially disposed wire-shaped anode therein, a longitudinal portion of each tube being cut away and covered with a thin foil thereby providing a window that is transparent to soft radiations, and interconnecting means attached to the tubes mounting the windows thereof in confronting relationship and contiguous to each other, said tubes having a gaseous filling of about 75 per cent methane and 25 per cent argon at a pressure of about 1 atmosphere.

11. A radiation counter comprising, in combination, a pair of Geiger-Müller type tubes each having a substantially cylindrical cathode forming a wall portion thereof and an axially disposed wire-shaped anode therein, a longitudinal portion of each tube being cut away and covered with a thin foil thereby providing a window that is transparent to soft radiations, interconnecting means including a copper conduit bent in the form of a semicircle for interconnecting corresponding ends of said tubes to form a pivot for said tubes as well as to equalize the pressure in said tubes, and means for locking said tubes in close parallel relationship.

JOHN A. SIMPSON, Jr.

REFERENCES CITED

The following references are of record in the file of this patent:

UNITED STATES PATENTS

| Number | Name | Date |
| --- | --- | --- |
| 2,094,318 | Failla | Sept. 28, 1937 |
| 2,324,556 | Brown | July 20, 1943 |
| 2,340,967 | Langer | Feb. 8, 1944 |
| 2,374,197 | Hare | Apr. 24, 1945 |
| 2,375,130 | Perrin et al. | May 1, 1945 |
| 2,397,071 | Hare | Mar. 19, 1946 |
| 2,397,661 | Hare | Apr. 2, 1946 |